Dec. 18, 1923.
O. W. TIMM
RUDDER BAR
Original Filed Jan. 11, 1921
1,478,308
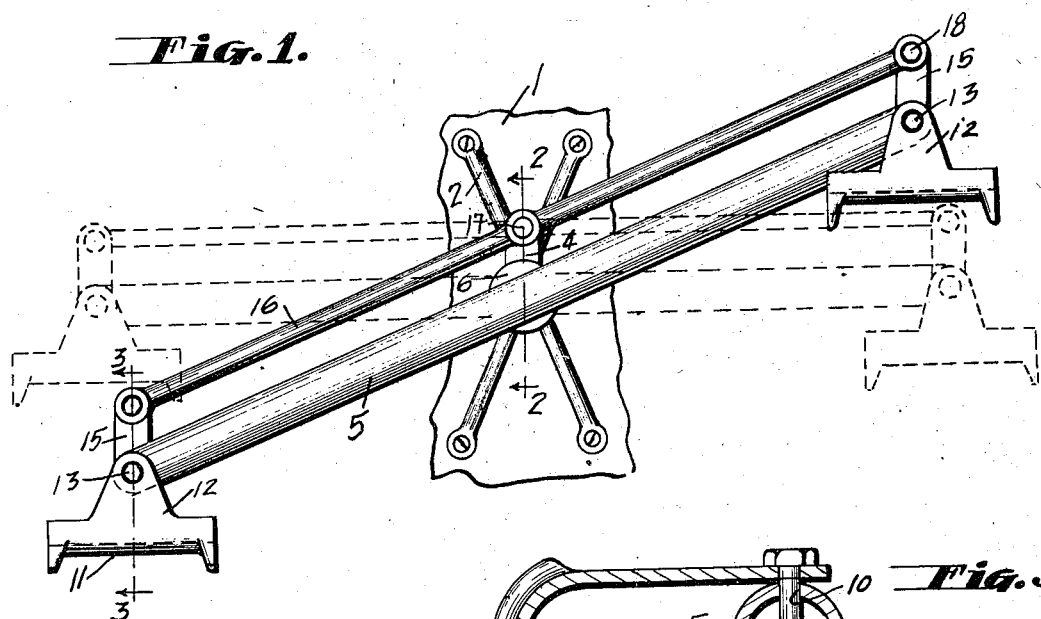
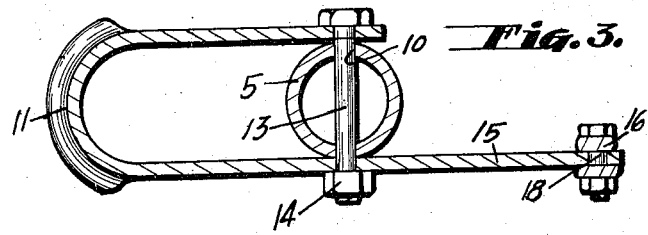
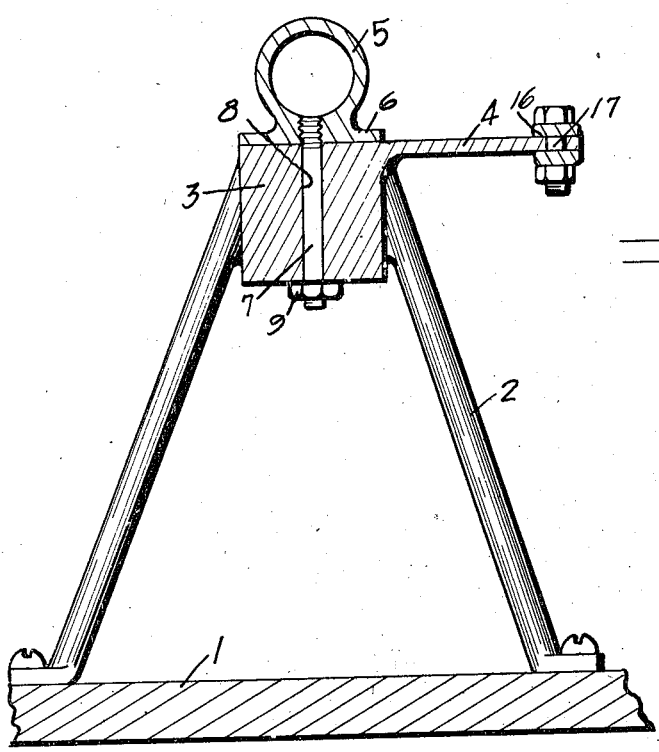
INVENTOR
Otto W. Timm.
by Hazard & Miller
ATTYS.

Patented Dec. 18, 1923.

1,478,308

UNITED STATES PATENT OFFICE.

OTTO W. TIMM, OF VENICE, CALIFORNIA.

RUDDER BAR.

Application filed January 11, 1921, Serial No. 436,562. Renewed October 24, 1923.

*To all whom it may concern:*

Be it known that I, OTTO W. TIMM, a citizen of the United States, residing at Venice, in the county of Los Angeles and State of California, have invented new and useful Improvements in Rudder Bars, of which the following is a specification.

It is the object of this invention to provide a rudder bar of the type employed in aeroplanes and the like, and comprising a pivoted bar having pedals at its respective ends for controlling pivotal movement of the bar by the feet.

It is the particular object of this invention to provide such a rudder bar having the pedals pivotally connected to the same, and provided with connecting means so arranged as to maintain the pedals at right angles to the feet irrespective of the position to which the rudder bar is swung upon its pivot.

A construction as thus set forth eliminates the possibility of the feet slipping from the pedal as in the usual construction wherein the pedals are fixed to the rudder bar, so that when the latter is swung upon its pivot, the pedals are turned at a sharp angle to the feet.

The invention will be readily understood from the following description of the accompanying drawings, in which:

Figure 1 is a plan view of a rudder bar constructed in accordance with the invention.

Figs. 2 and 3 are transverse elevations on the lines 2—2 and 3—3 of Fig. 1.

In the drawings the floor of an aeroplane or other device upon which the rudder bar is employed is shown at 1. The support for the rudder bar includes a bracket 2 fixed to the flooring 1 and carrying a bearing support 3 having the forwardly projecting lug 4.

The rudder bar is shown at 5, and is provided midway of its length with a bearing lug 6 adapted to be received against the bearing support 3. A stud 7 is threaded into the bearing lug 6 and projects from the same through a bearing 8 extending through the bearing support. A nut 9 is threaded upon the end of the stud, so that the rudder bar is held to the bearing support, but is free for pivotal movement about an axis provided by stud 7.

The ends of the rudder bar are provided with transverse openings 10, and the pedals are pivoted upon bolts received through these openings. The pedals may be of any usual construction including the foot surfaces 11 and rearwardly projecting ears 12 between which the ends of the rudder bar are received. Bolts 13 provided with nuts 14 are received through the ears of the pedals and through the openings in the ends of the rudder bar, so that the pedals may swing relative to the rudder bar to maintain the foot surfaces of the pedals at right angles to the feet, irrespective of the position to which the rudder bar is swung upon its pivot.

In order to automatically maintain the pedals in the desired position, one of the ears 12 of each of the pedals terminates in a rearwardly projecting lug 15. A link connection 16 is pivoted intermediate of its ends upon a bolt 17 received through the link connection and through the lug 4 projecting from bearing support 3. The ends of the link connection are similarly pivoted to lugs 15 as by bolts 18 received through the ends of the link connection and through the lugs.

The operation of the rudder bar will be readily understood by reference to Fig. 1, it being noted that the link connection 16 will swing the pedals relative to the rudder bar so as to maintain the tread surfaces of the pedals at right angles to the feet when the rudder bar is in either the position shown in full lines in Fig. 1, or in the position shown in dotted lines in Fig. 1.

It will be understood that the usual control cables are attached to the rudder bar in any desired manner as by means of the terminal bolts 20.

Various changes may be made without departing from the spirit of the invention as claimed.

What is claimed is:

1. The combination with a supporting block provided with a lug, of a rudder bar pivoted to said block, pedals pivotally connected to the ends of said rudder bar, lugs projecting rearwardly from the lower portions of said pedals, and a link connecting said lugs with the lug on the block to which the rudder bar is pivoted.

2. A device of the character described comprising a bearing support, a rudder bar fulcrumed on the support, a projecting lug formed on the support, a link fulcrumed on the lug, pedals arranged at the ends of the bar and each including spaced ears pivotally associated with the bar, and a lug constituting an extension of one of the ears and projecting rearwardly of the bar, and pivotal connections between the ends of the link and the lugs of said pedals.

In testimony whereof I have signed my name to this specification.

OTTO W. TIMM.